(12) United States Patent
Kim

(10) Patent No.: US 8,390,709 B2
(45) Date of Patent: Mar. 5, 2013

(54) CAMERA AND METHOD FOR ADJUSTING PHOTOGRAPHING TIME AND MODE

(75) Inventor: Hak-je Kim, Suwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 490 days.

(21) Appl. No.: 12/052,128

(22) Filed: Mar. 20, 2008

(65) Prior Publication Data

US 2009/0096916 A1 Apr. 16, 2009

(30) Foreign Application Priority Data

Oct. 15, 2007 (KR) ........................ 10-2007-0103532

(51) Int. Cl.
*H04N 5/235* (2006.01)
*H04N 3/14* (2006.01)
*H04N 5/335* (2011.01)

(52) U.S. Cl. ...................... 348/296; 348/230.1
(58) Field of Classification Search .............. 348/154, 348/155, 222.1, 229.1, 230.1, 231.9, 296, 348/312, 362

See application file for complete search history.

(56) References Cited

U.S. PATENT DOCUMENTS

| | | | |
|---|---|---|---|
| 4,714,963 A * | 12/1987 | Vogel | 348/220.1 |
| 7,154,539 B1 | 12/2006 | Nishimura et al. | |
| 7,324,136 B2 * | 1/2008 | Kubo | 348/220.1 |
| 7,783,191 B2 * | 8/2010 | Furumochi | 396/263 |
| 2002/0149693 A1* | 10/2002 | Tantalo et al. | 348/362 |
| 2003/0133034 A1 | 7/2003 | Takahashi | |
| 2006/0215924 A1 | 9/2006 | Steinberg et al. | |
| 2007/0216781 A1 | 9/2007 | Miyanohara | |
| 2008/0024619 A1* | 1/2008 | Ono | 348/222.1 |

FOREIGN PATENT DOCUMENTS

JP 2006-135501 A 5/2006

OTHER PUBLICATIONS

European Search Report issued in corresponding European Patent Application No. 08103239.3 on Apr. 1, 2011.
Communication dated Nov. 14, 2012, issued by the Korean Intellectual Property Office in counterpart Korean Patent Application No. 10-2007-0103532.

* cited by examiner

*Primary Examiner* — Daniel M Pasiewicz
(74) *Attorney, Agent, or Firm* — Sughrue Mion, PLLC

(57) ABSTRACT

A closed circuit television (CCTV) camera includes an image pickup unit to receive an image based on an object, convert the image to an electric signal, and output the electric signal, and a controller to adjust a photographing time or a photographing mode of the CCTV camera based on information of the object derived from the electric signal and pre-set condition information.

29 Claims, 5 Drawing Sheets

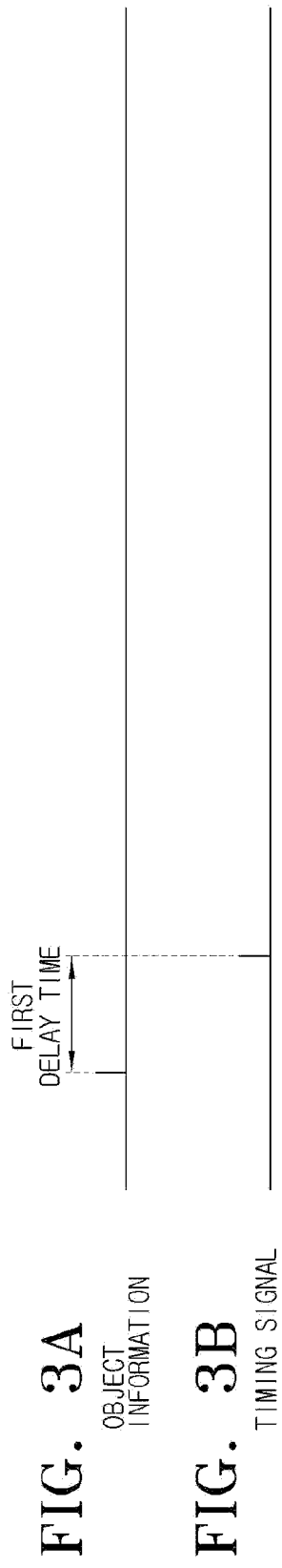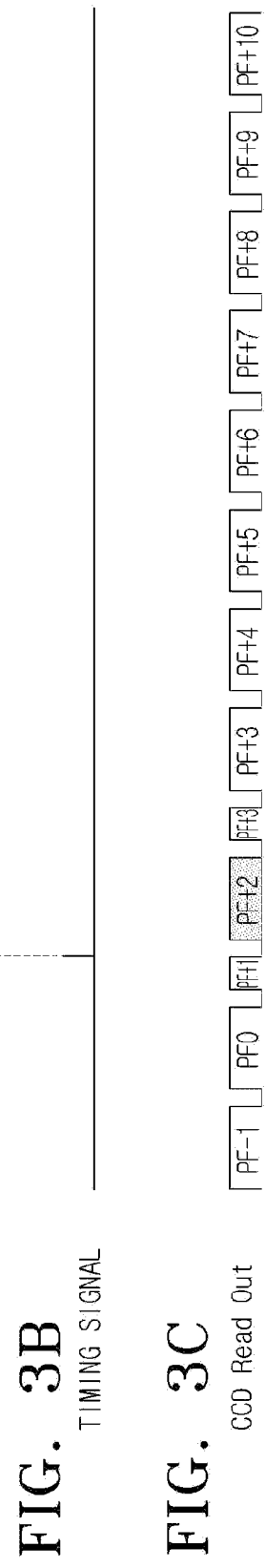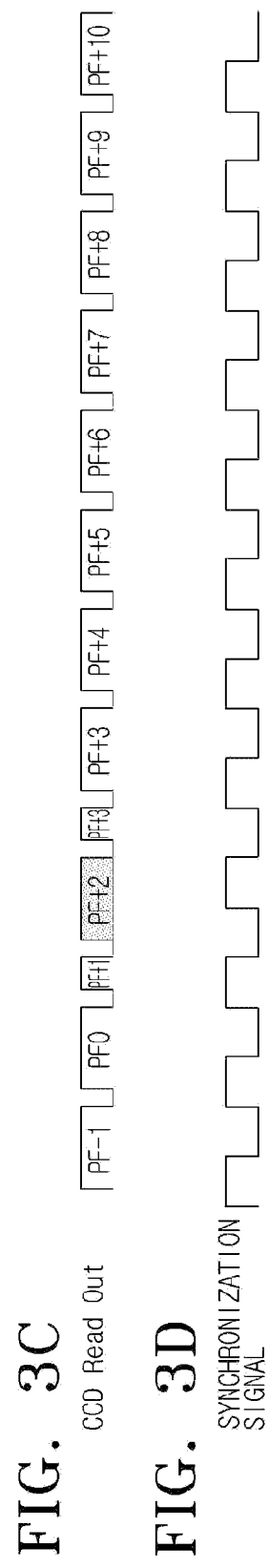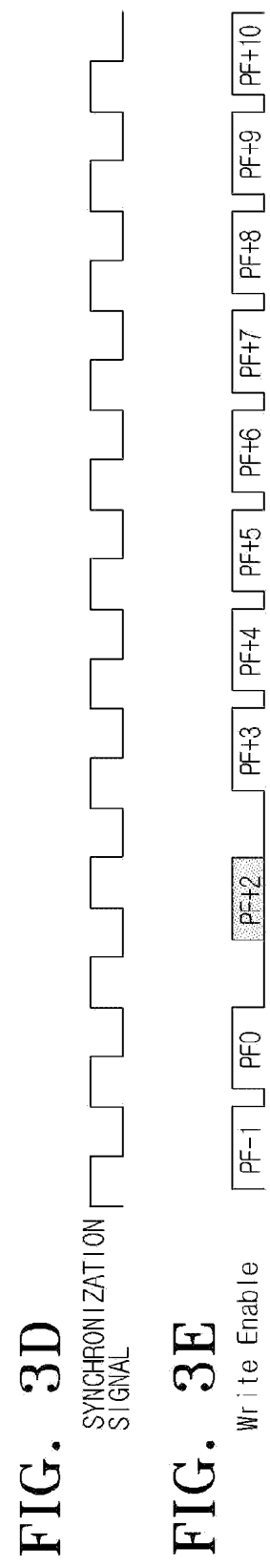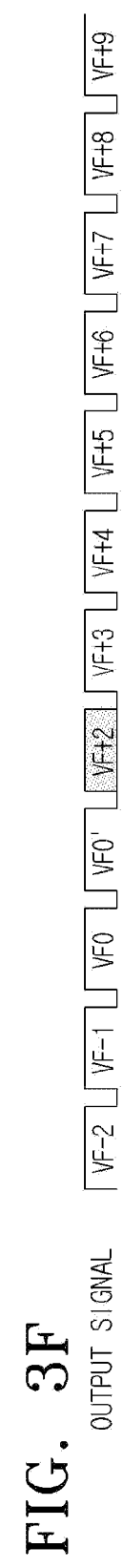

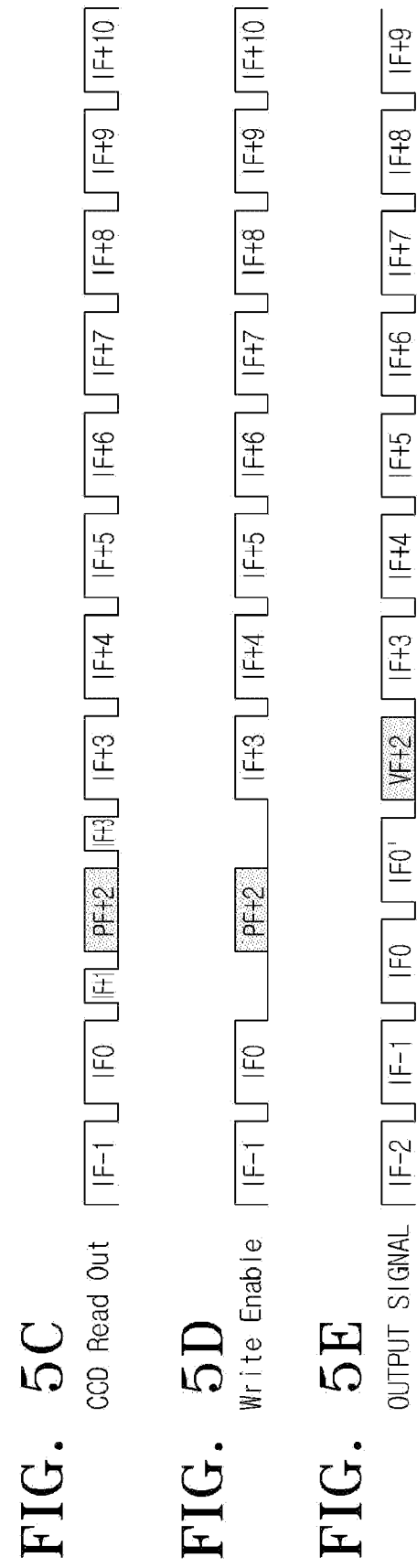
FIG. 5A OBJECT INFORMATION
FIG. 5B TIMING SIGNAL
FIG. 5C CCD Read Out
FIG. 5D Write Enable
FIG. 5E OUTPUT SIGNAL

CAMERA AND METHOD FOR ADJUSTING PHOTOGRAPHING TIME AND MODE

CROSS-REFERENCE TO RELATED APPLICATION

This application claims the benefits of Korean Patent Application No. 2007-103532, filed Oct. 15, 2007 in the Korean Intellectual Property Office, the disclosure of which is incorporated herein by reference.

BACKGROUND OF THE INVENTION

1. Field of the Invention

Aspects of the present invention relate to a camera and a photographing method thereof, and more particularly, to a camera which is capable of photographing an object more efficiently and a photographing method thereof.

2. Description of the Related Art

Methods for displaying a photographed image signal on a screen include a method using an interlaced scan and a method using a progressive scan. The progressive scan is used in a computer monitor, a digital TV, and a digital video recorder (DVR), and displays lines in sequence as a single image frame, as if a film is projected onto a screen.

In contrast, the interlaced scan is used in a general TV and a camera. The interlaced scan divides a single image frame into two fields and displays the two fields in an alternating fashion to display a single image. The interlaced scan outputs scan lines, for examples, 525 lines for the National Television System Committee (NTSC) system and 625 lines for the Phase Alternating Line (PAL) system, on a screen in 1/60 of a second intervals. That is, the interlaced scan outputs even-numbered scan lines in 1/60 of a second intervals and then outputs odd-numbered scan lines in 1/60 of a second intervals. Each scene in 1/60 of a second intervals is called a field and the added two fields are output in 1/30 of a second intervals and called a frame.

However, the interlaced scan adds the two fields to form a singe frame, and therefore, if there is a movement of an object between fields, the interlaced scan adds two sheets of image created at the different times to form a single frame. This movement causes a noise in contours of the image. In particular, if an object moving at high speed is photographed in the interlaced scan, a movement difference of the object between fields is great. Thus, image quality is degraded when the single frame is formed.

Also, the progressive scan generates a small number of frames per second, compared to the interlaced scan. Accordingly, if a specific portion of an object moving at high speed is photographed in the progressive scan, it is difficult to photograph the specific portion of the object due to the object's high speed movement.

SUMMARY OF THE INVENTION

Aspects of the present invention provide a camera which photographs an object in an interlaced scan or a progressive scan according to information about the object and a photographing method thereof.

Also, aspects of the present invention provide a camera which controls a synchronization operation to photograph a specific portion of an object which moves at high speed and a photographing method thereof.

According to an aspect of the present invention, a camera which photographs an object and outputs an image signal based on the object includes an image pickup unit to receive an image based on the object, convert the image to an electric signal, and output the electric signal, and a controller to control the image pickup unit based on information of the object derived from the electric signal and pre-set condition information to adjust a photographing time of the camera.

According to another aspect of the present invention, the information of the object includes a velocity of the object.

According to another aspect of the present invention, if the information of the object satisfies the pre-set condition information, the controller resets the image pickup unit to adjust the photographing time of the camera after a pre-set delay time.

According to another aspect of the present invention, the camera further includes a timing generator to output a timing signal used to adjust the photographing time of the camera. If the information of the object satisfies the pre-set condition information, the controller controls the timing generator to output the timing signal and may reset the image pickup unit according to the output timing signal.

According to another aspect of the present invention, the camera further includes a signal processor to convert the electric signal output from the image pickup unit to an image signal, and a storage unit to store the image signal as a series of frames. If the information of the object satisfies the pre-set condition information, the controller stops writing the image signal onto the storage unit and repeatedly outputs a previous frame output from the signal processor, the previous frame being a most recent frame output from the signal processor before a moment when the information of the object satisfies the pre-set condition information.

According to another aspect of the present invention, the controller writes the image signal photographed at the adjusted photographing time onto the storage unit.

According to another aspect of the present invention, the image pickup unit outputs a progressive image signal. If the information of the object satisfies the pre-set condition information, the controller controls the image pickup unit such that the progressive image signal output from the image pickup unit is written after a pre-set delay time.

According to another aspect of the present invention, a photographing method of a camera which photographs an object and outputs an image signal includes receiving an image based on the object, converting an electric charge accumulated in an image pickup device based on the received image to an electric signal, outputting the electric signal, and adjusting a photographing time of the camera based on information of the object derived from the electric signal and pre-set condition information.

According to another aspect of the present invention, the information of the object includes a velocity of the object.

According to another aspect of the present invention, if the information of the object satisfies the pre-set condition information, the adjusting of the photographing time further includes resetting the image pickup device to adjust the photographing time of the camera after a pre-set delay time.

According to another aspect of the present invention, the method further includes generating a timing signal to adjust the photographing time of the camera. If the information of the object satisfies the pre-set condition information, the adjusting of the photographing time further includes resetting the image pickup device using the generated timing signal.

According to another aspect of the present invention, the method further includes converting the electric signal to an image signal, and writing the converted image signal to a storage unit. If the information of the object satisfies the condition information, the method further includes stopping the writing of the converted image signal and repeatedly outputting a previous frame which is a most recent frame output before a moment when the information of the object satisfies the pre-set condition information.

According to another aspect of the present invention, the outputting of the electric signal comprises outputting a progressive image signal. If the information of the object satisfies the pre-set condition information, the adjusting of the photographing time includes writing the progressive image signal after a pre-set delay time.

According to another aspect of the present invention, a camera which photographs an object and outputs an image signal based on the object includes an image pickup unit to receive an image based on the object, convert the image to an electric signal, and output the electric signal, and a controller to control the image pickup unit based on information of the object derived from the electric signal and pre-set condition information to convert a photographing mode of the camera.

According to another aspect of the present invention, the information of the object includes facial pattern information of the object.

According to another aspect of the present invention, the photographing mode includes at least one of a progressive scan mode or an interlaced scan mode.

According to another aspect of the present invention, if the photographing mode of the camera is an interlaced scan mode, the controller converts the photographing mode to a progressive scan mode, and if the photographing mode of the camera is a progressive scan mode, the controller converts the photographing mode to an interlaced scan mode.

According to another aspect of the present invention, if the information of the object satisfies the pre-set condition information, the controller converts the photographing mode after a pre-set delay time.

According to another aspect of the present invention, the camera further includes a timing generator to generate a timing signal used to convert the photographing mode. The controller controls the timing generator to output the timing signal to the image pickup unit after the pre-set delay time and may reset the image pickup unit based on the output timing signal.

According to another aspect of the present invention, the camera further includes an adder to output a progressive image signal or an interlaced image signal using the electric signal output from the image pickup unit. If the information of the object satisfies the pre-set condition information, the controller controls the adder to output the progressive image signal, and if the information of the object does not satisfy the pre-set condition information, the controller controls the adder to output the interlaced image signal.

According to another aspect of the present invention, the camera further includes a storage unit, wherein if the information of the object satisfies the pre-set condition information, the controller converts the photographing mode of the camera and writes an image signal photographed in the converted photographing mode to the storage unit.

According to another aspect of the present invention, a photographing method of a camera which photographs an object and outputs an image signal based on the object includes receiving an image based on the object, converting an electric charge accumulated in an image pickup device based on the received image to an electric signal, outputting the electric signal, and controlling the image pickup device to convert a photographing mode of the camera based on information of the object derived from the electric signal and pre-set condition information.

According to another aspect of the present invention, the information of the object includes facial pattern information of the object.

According to another aspect of the present invention, the photographing mode includes at least one of a progressive scan mode or an interlaced scan mode.

In addition to the example embodiments and aspects as described above, further aspects and embodiments will be apparent by reference to the drawings and by study of the following descriptions.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 3A-3F are timing charts to explain a method to operate a CCTV camera to adjust a photographing time; FIGS. 5A-5E are timing charts to explain a method for operating a CCTV camera to convert a scanning method.

DETAILED DESCRIPTION OF THE EMBODIMENTS

Figure 1:
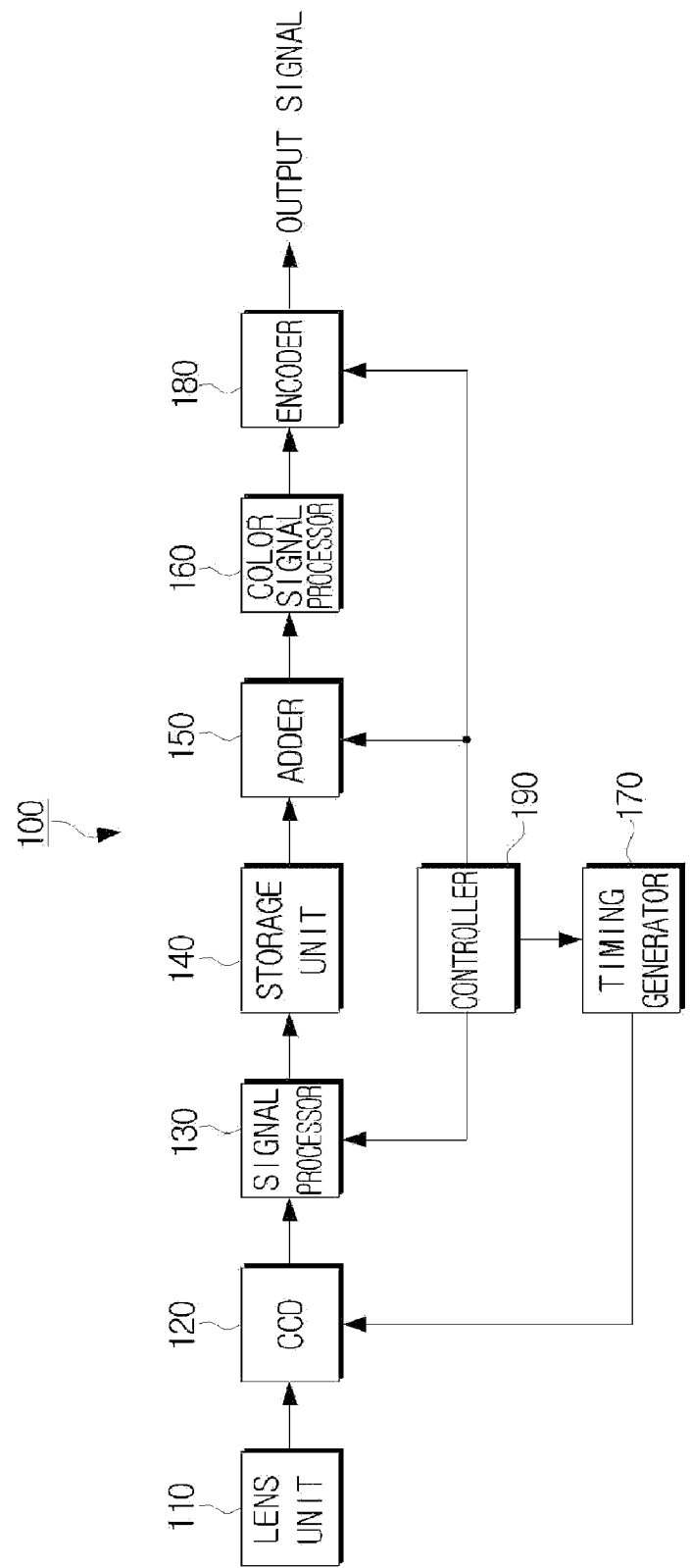
FIG. 1 is a block diagram illustrating a CCTV camera according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a CCTV camera according to an embodiment of the present invention. Referring to FIG. 1, a CCTV camera 100 according to an embodiment of the present invention includes a lens unit 110, a charge-coupled device (CCD) 120, a signal processor 130, a storage unit 140, an adder 150, a color signal processor 160, a timing generator 170, an encoder 180, and a controller 190. It is understood that the CCTV camera 100 is not limited to the components shown in FIG. 1 and described below, and may have various other components as well, such as additional lenses, additional encoders, etc.

The CCD 120 has an image pickup unit which has photoelectric transformation elements arranged in a grid pattern and outputs an electric charge accumulated in each photoelectric transformation element by receiving light as an electric signal. The CCD 120 receives an image from an external object to photograph through the lens unit 110 and converts the image received from the object to an electric signal. Hereinafter, the term "object" or "external object" refers to an object which is photographed by the CCTV camera 100, and the term "optical signal" refers to an image which is captured by the CCD 120. According to an aspect of the present invention, the CCD 120 is a progressive CCD which comprises a vertical CCD and a horizontal CCD and accumulates progressive image signals. However, it is understood that the CCD 120 is not limited to being a progressive CCD, and instead may be various other types of CCDs.

The CCD 120 is reset by a timing signal received from the timing generator 170, which will be described in detail below. Accordingly, a photographing time of the object is adjustable.

The signal processor 130 performs a correlated double sampling operation, a gain control amplification operation, and an A/D conversion operation with respect to the electric signal received from the CCD 120. The signal processor 130 removes a noise from the received electric signal by performing a correlated double sampling. Also, the signal processor 130 amplifies the noise-removed signal to a predetermined gain and then converts the signal to a digital signal.

The storage unit 140 stores odd-numbered pixels and even-numbered pixels of the progressive image signal processed by the signal processor 120. According to an aspect of the present invention, the storage unit 140 is a single storage unit which uses different address areas to store the odd-numbered pixels and the even-numbered pixels respectively. However, other aspects of the present invention are not limited to such, and the storage unit 140 may instead include, two storage units which are used to store the odd-numbered pixels and the even-numbered pixels, respectively. An example of the storage unit 140 is a buffer.

The adder 150 generates a progressive image signal or an interlaced image signal according to control commands transmitted by the controller 190. More specifically, to generate the progressive image signal, the adder 150 adds the even-numbered pixels and the odd-numbered pixels read out from the storage unit 140 in sequence, thereby generating a progressive image signal. To generate the interlaced image signal, the adder 150 adds the odd-numbered pixels read out from the storage unit 140 to generate an odd field and adds the even-numbered pixels read out from the storage unit 140 to generate an even field, thereby generating an interlaced image signal.

The adder 150 generates a progressive image signal of a single frame by adding the even-numbered pixels and the odd-numbered pixels read out from the storage unit 140 in sequence. Also, the adder 150 generates an interlaced image signal of a single frame using an even field generated by adding only the even-numbered pixels read out from the storage unit 140 and an odd field generated by adding only the odd-numbered pixels read out from the storage unit 140.

The color signal processor 160 performs a color separation operation with respect to the image signal received from the adder 150 and performs a predetermined color reproduction process to improve a color reproduction characteristic of the received image signal. According to an aspect of the present invention, the color signal processor 160 separates a brightness signal and a color difference signal from the image signal received from the adder 150.

The timing generator 170 generates a timing signal to control operations of the CCTV camera 100 according to control commands transmitted by the controller 190. The timing signal is used to adjust a photographing time of an object or to convert a photographing mode, which are collectively referred to as "photographing conditions." The timing signal may be used to convert a progressive scan to an interlaced scan or vice versa. Also, it is understood that photographing conditions other than a photographing time and a photographing mode may also be adjusted, such as resolution, color, night vision, and other photographing features commonly found in cameras.

The encoder 180 combines the color difference signal and the brightness signal received from the color signal processor 160 with a synchronization signal received from the controller 190, thereby generating and outputting a composite image signal suitable for a standard definition display. Standard definition characteristics are defined by NTSC, PAL, High-Definition (HD), and Standard Definition (SD).

The controller 190 controls the timing generator 170 to generate a timing signal to adjust a photographing time of the object. More specifically, if information of an object to photograph satisfies a pre-set condition information, the controller 190 controls the timing generator 170 to generate a timing signal. Specifically, if the CCTV camera 100 is in a progressive scan mode, the controller 190 controls the timing generator 170 to generate a timing signal to adjust a photographing time. Additionally, if the CCTV camera 100 is in an interlaced scan mode, the controller 190 controls the timing generator 170 to generate a timing signal to convert the interlaced scan mode to the progressive scan mode.

According to an aspect of the present invention, the pre-set condition information is information about a velocity of the object or information about an image of at least one part of a body such as a face, an eye, a nose, and a finger print. The information of the object is derived from the electric signal generated by the CCD 120. However, it is understood that the pre-set condition information is not limited to being information about a velocity or information about an image of at least one part of a body, and instead may be various other types of information, such as, for example, information about an inanimate object which is not a part of a human body.

Figure 2:
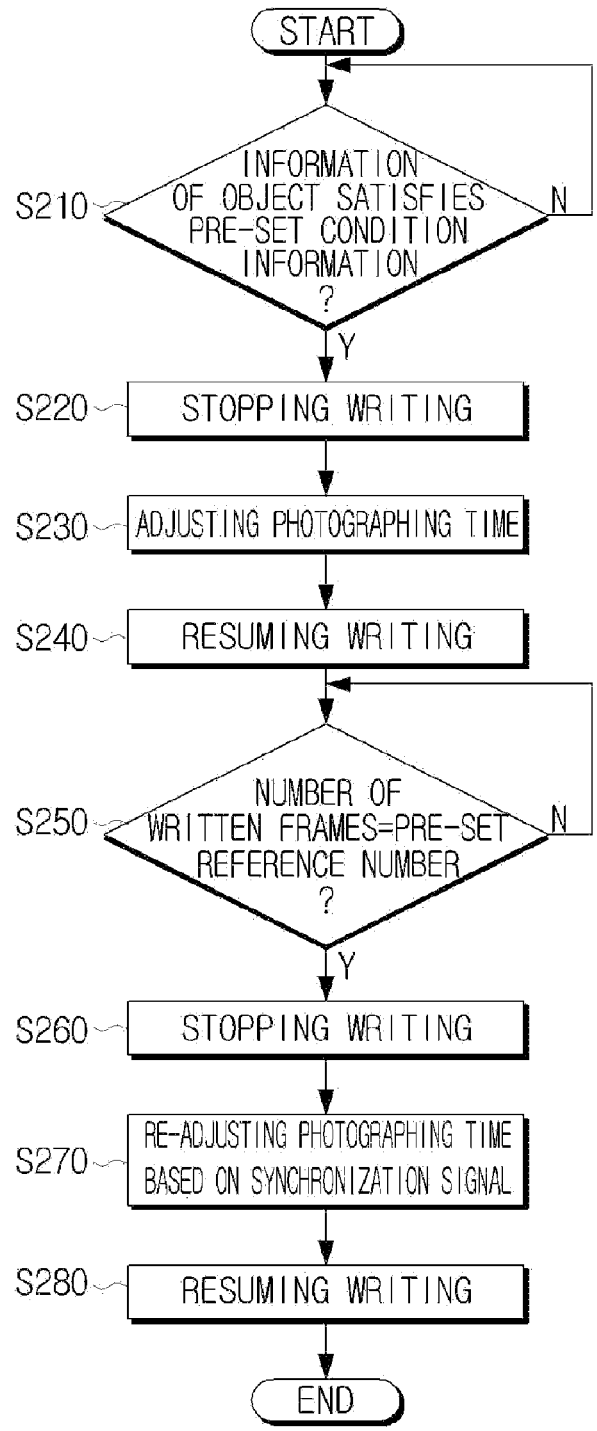
FIG. 2 is a flowchart illustrating a method to operate a CCTV camera according to an embodiment of the present invention.

A method to adjust a photographing time based on the information of the object captured by the CCTV camera 100 which is received from outside of the CCTV camera 100 and the pre-set condition information will be described in detail with reference to FIG. 2. FIG. 2 is a flowchart illustrating a method to operate the CCTV camera 100 according to an embodiment of the present invention. In the description made with reference to FIG. 2, a velocity of an object is set as an example of condition information.

First, the controller determines whether information of an object captured by the CCTV camera 100, i.e., received from outside of the CCTV camera 100, satisfies pre-set condition information at operation S210. For example, the condition information is set to "a velocity greater than or equal to 100 km/h". If a velocity of the object is, for example, 110 km/h, then the information of the object satisfies the pre-set condition information, and the controller 190 determines that the information of the object satisfies the condition information at operation S210 (S210: Y). If a velocity of the object is, for example, 90 km/h, the information of the object does not satisfy the pre-set condition information, and the controller 190 determines that the information of the object does not satisfy the condition information at operation S210 (S210: N).

Next, if it is determined that the information of the object satisfies the condition information at operation S210 (S210: Y), the controller 190 stops writing a progressive image signal onto the storage unit 140 at operation S220. At this stage, the controller 190 repeatedly outputs the most recent frame which has been output from the adder 150. That is, in order to fill in a blank frame which continues to be generated after the writing of the image signal is stopped, the controller 190 repeatedly outputs the previous frame output from the adder 150.

Then, when a pre-set first delay time elapses, the controller 190 controls the timing generator 170 to change a photographing time at operation S230. The first delay time is a predetermined amount of time which is set such that the object is photographed at a desired time after the first delay time. In particular, the first delay may be set to enable a specific portion of the object to be photographed at a desired time.

Referring to FIGS. 3A-3C, the object information shown in FIG. 3A represents visual information of the object captured by the CCTV camera 100. When the object information shown in FIG. 3A satisfies the pre-set condition information, the pre-set first delay time is triggered. When the pre-set first delay time elapses, the controller 190 controls the timing generator 170 to output a timing signal shown in FIG. 3B. Upon receiving the timing signal, the CCD 120 is reset such that the CCD 120 receives an optical signal of the object through the lens unit 110 and converts the optical signal to an electric signal after the time is reset, the electric signal represented by the shaded box "PF +2" shown in the CCD read-out signal of FIG. 3C. Accordingly, the photographing time is adjusted.

Next, the controller 190 resumes the writing operation of the image signal output from the signal processor 130 at operation S240. That is, the controller 190 performs a predetermined signal processing operation with respect to the electric signal "PF +2" output from the reset CCD 120 and writes a progressive image signal output from the signal processor 130 onto the storage unit 140, represented by the write enable signal FIG. 3E. At this time, the controller 190 may write an index indicating the adjusted photographing time along with the image signal output from the signal processor 130 onto the storage unit 140. It is understood, however, that the controller 190 is not required to write an index indicating the adjusted photographing time.

Also, the controller 190 determines whether the number of written frames is identical to a pre-set reference number at operation S250. The number of written frames indicates the number of frames made from the image signal photographed at the adjusted photographing time.

Next, if it is determined that the number of frames generated from the image signal photographed at the adjusted photographing time is identical to the pre-set reference number at operation S250 (operation S250:Y), the controller 190 stops writing the photographed image signal at operation S260. That is, the controller 190 controls the signal processor 130 to stop writing the image signal photographed at the photographing time adjusted in operation S230 onto the storage unit 140.

Next, the controller 190 re-adjusts the photographing time based on a pre-set synchronization signal at operation S270. The synchronization signal is previously set to synchronize with the signal output from the encoder 180.

That is, as shown in FIGS. 3B, 3D, and 3F, the controller 190 controls the timing generator 170 to generate a timing signal (FIG. 3B) to re-adjust the photographing time, and re-adjusts the photographing time by resetting the CCD 120 using the generated timing signal. At this time, the controller 190 re-adjusts the photographing time by generating a timing signal to synchronize the signal output from the encoder 180, i.e. the image signal output to the screen shown in FIG. 3F, with the synchronization signal shown in FIG. 3D.

Next, the controller 190 resumes the writing operation of an image signal corresponding to the object photographed at the re-adjusted photographing time at operation S280. That is, the controller 190 controls the signal processor 130 to write the image signal corresponding to the object photographed at the photographing time re-adjusted at operation S270 onto the storage unit 140.

According to another aspect of the present invention, the operations S250 through S280 may be omitted. In this case, once the photographing time is adjusted in operation S230, the image signal corresponding to the object photographed from the adjusted photographing time may be written onto the storage unit 140, and may be continuously written onto the storage unit 140 based on the adjusted photographing time without re-adjusting of the photographing time.

Figure 4:
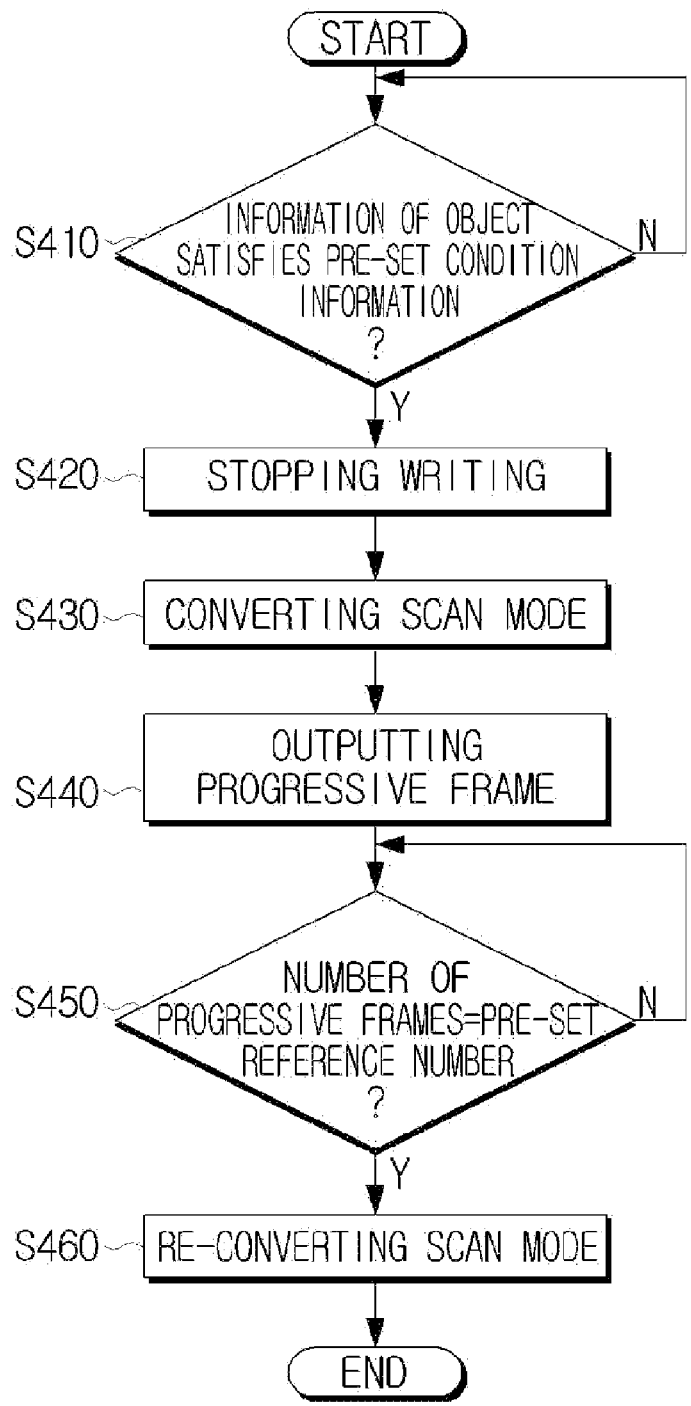
FIG. 4 is a flowchart illustrating a method to operate a CCTV camera according to another embodiment of the present invention.

FIG. 4 is a flowchart illustrating a method for operating a CCTV camera according to another exemplary of the present invention. In the description made with reference to FIG. 4, a facial recognition condition of whether facial pattern information captured by the CCTV camera 100 matches pre-set facial pattern information is set as an example of condition information.

First, the controller 190 determines whether information of an object received from the outside, i.e., information of an object derived from an electric signal based on the image, satisfies pre-set condition information at operation S410. If facial pattern information is set as the condition information, the controller 190 determines whether facial pattern information of the object received from the outside satisfies the condition information or not. The facial pattern information of the object is obtained by receiving an image signal photographed in an interlaced scan by the CCTV camera 100 using a facial recognition algorithm well-known in the art, and so a detailed description of the facial recognition algorithm is omitted.

If the information of the object satisfies the condition information at operation S140 (S410: Y), the controller 190 stops writing an interlaced image signal onto the storage unit 140 (S420). At this time, the controller 190 repeatedly outputs a previous frame which has been output from the adder 150. That is, in order to fill in a blank frame which is generated even after the writing of the interlaced image signal is stopped, the controller 190 repeatedly outputs the previous frame output from the adder 150.

Also, the controller 190 generates a timing signal to convert a scan mode if a pre-set second delay time elapses at operation S430. The second delay time is set such that the scan mode is converted at a specific time after the second delay time elapses.

More specifically, referring to FIGS. 5A-5C, the object information shown in FIG. 5A represents visual information of the object captured by the CCTV camera 100. When the object information shown in FIG. 5A satisfies the condition information, the pre-set second delay time is triggered. When the pre-set second delay time elapses, the controller 190 controls the timing generator 170 to output a timing signal shown in FIG. 5B to convert the scan mode and controls the adder 150 to output a progressive image signal. Upon receiving the timing signal, the CCD 120 is reset such that the CCD 120 receives an optical signal through the lens unit 110 and converts the optical signal to an electrical signal "PF +2" from the reset time in the CCD read out shown in FIG. 5C.

The adder 150 forms a single frame by adding odd-numbered pixels and even-numbered pixels stored in the storage unit 140 in sequence according to control commands of the controller 190 and outputs the single frame. That is, at the time that the timing signal is generated, the controller 190 controls the adder 150 to convert a photographing mode of the CCTV camera 100 from the interlaced scan mode represented by the box "IF +1" in FIG. 5C to the progressive scan mode represented by the box "PF +2" in FIG. 5C.

Next, the controller 190 outputs the frame "PF +2" generated in the progressive scan mode on a display connected to the CCTV camera 100 at operation S440, as represented by the output frame "VF +2" shown in FIG. 5E. The display may be any one of various types of displays known in the art, such as liquid crystal displays (LCDs), plasma displays, etc. At this time, the controller 190 may write this progressive frame "PF +2" onto a recording medium, such as a digital video disk (DVD), a hard drive, a BD, an HD-DVD, etc., connected to the CCTV camera 100, in addition to or instead of outputting the progressive frame to the display, as shown in FIG. 5D. The controller 190 may write an identifier, an index, etc., indicating identification information of the progressive frame to the recording medium along with the progressive frame "PF +2", although the controller 190 is not required to write such an index.

Then, the controller 190 determines whether the number of generated progressive frames is identical to a pre-set reference number at operation S450. If the number of progressive frames is identical to the pre-set reference number (S450:Y), the controller 190 re-converts the photographing mode from the progressive scan mode to the interlaced scan mode at operation S460. That is, the controller 190 controls the signal processor 130 not to record the photographed image signal to the storage unit 140 and controls the adder 150 not to output the progressive frame. Then, the controller 190 controls the timing generator 170 to generate a timing signal to convert the scanning mode. At this time, upon receiving the timing signal, the CCD 120 is reset such that the CCD 120 converts the photographed optical signal to an electric signal and outputs the electric signal after the time has been reset. The signal processor 130 performs a predetermined signal processing operation with respect to the received electric signal and stores the signal to the storage unit 140.

Also, the controller 190 controls the adder 150 to add the odd-numbered pixels stored in the storage unit 140 to generate an odd field and add the even-numbered pixels to generate an even field. That is, the controller 190 controls the adder 150 to generate a single interlaced frame which is formed by interlacing the odd field and the even field, thereby re-converting the photographing mode of the CCTV camera 100 from the progressive scan mode to the interlaced scan mode at operation S460.

Also, the controller 190 outputs the image signal of the reconverted interlaced frame to a display (not shown), such as an LCD, plasma, etc., connected to the CCTV camera 100. At this time, the controller 190 may write an identifier, an index, etc., indicating identification information of the interlaced frame to a recording medium connected to the CCTV camera 100 along with the interlaced frame.

In the above-described embodiments, the CCTV camera 100 supports both the interlaced scan mode and the progressive scan mode. However, other aspects of the present invention do not require the CCTV camera 100 to support both the interlaced scan mode and the progressive scan mode. For example, if the CCTV camera 100 supports only the progressive scan mode, the adder 150 may be omitted. In this case, the odd-numbered pixels and the even-numbered pixels are output from the storage unit 140 in sequence, thereby generating an interlaced frame.

As described above, according to aspects of the present invention, a photographing time of the CCTV camera 100 may be adjusted based on the information of the object received from the outside, i.e., the visual information of the object captured by the CCTV camera 100, and thus a specific portion of the object can be photographed.

Also, according to aspects of the present invention, a photographing mode of the CCTV camera 100 is converted based on the information of the object so that an image quality of the object can be improved.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the pre-set condition information is not limited to being information about a velocity of the object or information about an image of at least one part of a body, and may instead be a combination thereof, or may also be other types of information, such as images of specific types of inanimate objects. Further, aspects of the present invention may be used with various types of cameras other than CCTVs. Accordingly, it is intended, therefore, that the present invention not be limited to the various example embodiments disclosed, but that the present invention includes all embodiments falling within the scope of the appended claims.

What is claimed is:

1. A camera which photographs an object and outputs an image signal based on the object, the camera comprising:
    an image pickup unit which receives moving images of the object, converts the received moving images to an electric signal, and outputs the electric signal; and
    a controller which controls the image pickup unit to reset the image pickup unit based on information about the object derived from the electric signal and a condition pre-set in the controller, by which the image pickup unit stops receiving moving images of the object and restarts receiving moving images of the object.

2. The camera as claimed in claim 1, wherein the information about the object comprises a velocity of the object.

3. The camera as claimed in claim 1, wherein, if the controller determines that the information about the object satisfies the pre-set condition, the controller resets the image pickup unit to restart the receiving the moving image of the object after a pre-set delay time from a moment when the information about the object satisfies the pre-set condition, regardless of a synchronization signal.

4. The camera as claimed in claim 1, further comprising a timing generator which outputs a timing signal used to reset the image pickup unit,
    wherein, if the information about the object satisfies the pre-set condition, the controller controls the timing generator to output the timing signal to reset the image pickup unit according to the output timing signal.

5. The camera as claimed in claim 1, further comprising:
    a signal processor which converts the electric signal output from the image pickup unit to an image signal; and
    a storage unit which stores the image signal as a series of frames,
    wherein, if the information about the object satisfies the pre-set condition, the controller stops writing the image signal onto the storage unit and repeatedly outputs a previous frame output from the signal processor, the previous frame being a most recent frame output from the signal processor before a moment when the information about the object satisfies the pre-set condition.

6. The camera as claimed in claim 5, wherein the controller writes the image signal photographed at the restarted photographing time onto the storage unit.

7. The camera as claimed in claim 1, wherein the image pickup unit outputs a progressive image signal,
    wherein, if the information about the object satisfies the pre-set condition, the controller controls the image pickup unit such that the progressive image signal output from the image pickup unit is written after a pre-set delay time regardless of a synchronization signal.

8. The camera as claimed in claim 1, wherein the controller controls the image pickup unit to reset the image pickup unit based on information about the object derived from the electric signal and a condition pre-set in the controller, by which the image pickup unit stops receiving moving images of the object and restarts receiving moving images of the object at a desired time regardless of a synchronization signal of the camera.

9. A photographing method of a camera which photographs an object and outputs an image signal based on the object, the method comprising:
receiving moving images of the object;
converting an electric charge accumulated in an image pickup unit based on the received moving images to an electric signal;
outputting the electric signal; and
resetting the image pickup unit to stop receiving moving images of the object and to restart receiving moving images of the object, based on information about the object derived from the electric signal and a condition present in a controller of the camera.

10. The method as claimed in claim 9, wherein the information about the object comprises a velocity of the object.

11. The method as claimed in claim 9, wherein, if it is determined that the information about the object satisfies the pre-set condition, the resetting the image pickup unit to restart the receiving the moving image of the object comprises resetting the image pickup unit to restart the receiving the moving image of the object after a pre-set delay time from a moment when the information about the object satisfies the pre-set condition, regardless of a synchronization signal.

12. The method as claimed in claim 9, further comprising generating a timing signal to reset the image pickup unit,
wherein, if the information about the object satisfies the pre-set condition, the resetting the image pickup unit to restart the receiving the moving image of the object is performed based on the generated timing signal.

13. The method as claimed in claim 9, further comprising:
converting the electric signal to the image signal; and
writing the converted image signal to a storage unit,
wherein, if the information about the object satisfies the pre-set condition, the method further comprises:
stopping the writing of the converted image signal, and
repeatedly outputting a previous frame corresponding to a most recent frame output before a moment when the information about the object satisfies the pre-set condition.

14. The method as claimed in claim 9, wherein the outputting of the electric signal comprises outputting a progressive image signal,
wherein, if the information about the object satisfies the pre-set condition, the resetting the image pickup unit to restart the photographing comprises writing the progressive image signal after a pre-set delay time regardless of a synchronization signal.

15. The method of claim 9, wherein, by the resetting the image pickup unit, receiving moving images of the object is restarted at a desired time regardless of a synchronization signal of the camera.

16. A camera, comprising:
an image pickup unit which receives moving images of an object and converts the received moving images to an electric signal; and
a controller which controls the image pickup unit to adjust at least one photographing condition of the camera by resetting the image pickup unit, based on whether information about the object derived from the electric signal corresponds to a condition pre-set in the controller,
wherein the at least one photographing condition comprises at least one of:
stopping receiving moving images of the object and restarting receiving moving images of the object; and
changing a photographing mode of the camera.

17. The camera of claim 16, wherein the photographing conditions comprise the photographing mode, and if the camera is in an interlaced scan mode and the information about the object corresponds to the pre-set condition, the controller adjusts the photographing mode from the interlaced scan mode to a progressive scan mode.

18. The camera of claim 17, wherein the information about the object comprises facial pattern information about the object, and the pre-set condition comprises pre-set facial pattern information.

19. The camera of claim 16, wherein the controller controls the image pickup unit to reset the image pickup unit to restart the photographing of the object after a pre-set delay time regardless of a synchronization signal, if the information about the object corresponds to the pre-set condition.

20. The camera of claim 19, wherein the information about the object comprises a velocity of the object, and the pre-set condition comprises a pre-set velocity.

21. The camera of claim 20, wherein the information about the object corresponds to the pre-set condition if the velocity of the object is equal to or greater than the pre-set velocity.

22. The camera of claim 16, wherein the restarting receiving moving images of the object is performed at a desired time regardless of a synchronization signal of the camera.

23. A photographing method to be used with a camera, comprising:
receiving moving images based on an object;
converting the moving images to an electric signal; and
controlling an image pickup unit to adjust at least one photographing condition of the camera by resetting the image pickup unit, based on whether information about the object derived from the electric signal corresponds to a condition pre-set in a controller of the camera,
wherein the at least one photographing condition comprises at least one of:
stopping receiving moving images of the object and restarting receiving moving images of the object; and
changing a photographing mode of the camera.

24. The photographing method of claim 23, wherein the photographing conditions comprise the photographing mode, and if the camera is in an interlaced scan mode and the information about the object derived from the image corresponds to the pre-set condition, the controlling of the image pickup unit comprises converting the interlaced scan mode to a progressive scan mode.

25. The photographing method of claim 24, wherein the information about the object comprises facial pattern information about the object, and the pre-set condition comprises pre-set facial pattern information.

26. The photographing method of claim 23, wherein the controlling the image pickup unit to reset the image pickup unit to restart the receiving the moving image of the object comprises controlling the image pickup unit to reset the image pickup unit to restart the receiving the moving image of the object after a pre-set delay time from a moment when the information about the object satisfies the pre-set condition, regardless of a synchronization signal.

27. The photographing method of claim 23, wherein the information about the object comprises a velocity of the object, and the pre-set condition comprises a pre-set velocity.

28. The photographing method of claim 27, wherein the information about the object corresponds to the pre-set condition if the velocity of the object is equal to or greater than the pre-set velocity.

29. The method of claim 23, wherein the restarting receiving moving images of the object is performed at a desired time regardless of a synchronization signal of the camera.

* * * * *